Oct. 2, 1928.

R. E. BOWEN 1,685,770

ADJUSTABLE VEHICLE SEAT

Filed July 6, 1926   2 Sheets-Sheet 2

Inventor
RICHARD E. BOWEN
Attorney

Patented Oct. 2, 1928.

1,685,770

UNITED STATES PATENT OFFICE.

RICHARD E. BOWEN, OF LOS ANGELES, CALIFORNIA.

ADJUSTABLE VEHICLE SEAT.

Application filed July 6, 1926. Serial No. 120,823.

My invention relates to adjustable seats, particularly adapted, although not necessarily, for use in automobiles of the coach or coupé type.

It is a purpose of my invention to provide a vehicle seat having relatively simple, inexpensive and durable means by which the seat can be quickly adjusted horizontally toward or away from the steering wheel to accommodate drivers of different leg lengths; vertically to any desired height within certain limits; and a seat in which the seat portion as well as the back portion can be tilted to any desired inclination to suit the requirements of a particular driver, all of the recited adjustments being embodied in a structure which is hingedly mounted to permit the forward folding of the seat when desired.

I will describe only one form of adjustable vehicle seat embodying my invention and will point out the novel features thereof in claims.

In the accompanying drawings.

Figure 1:
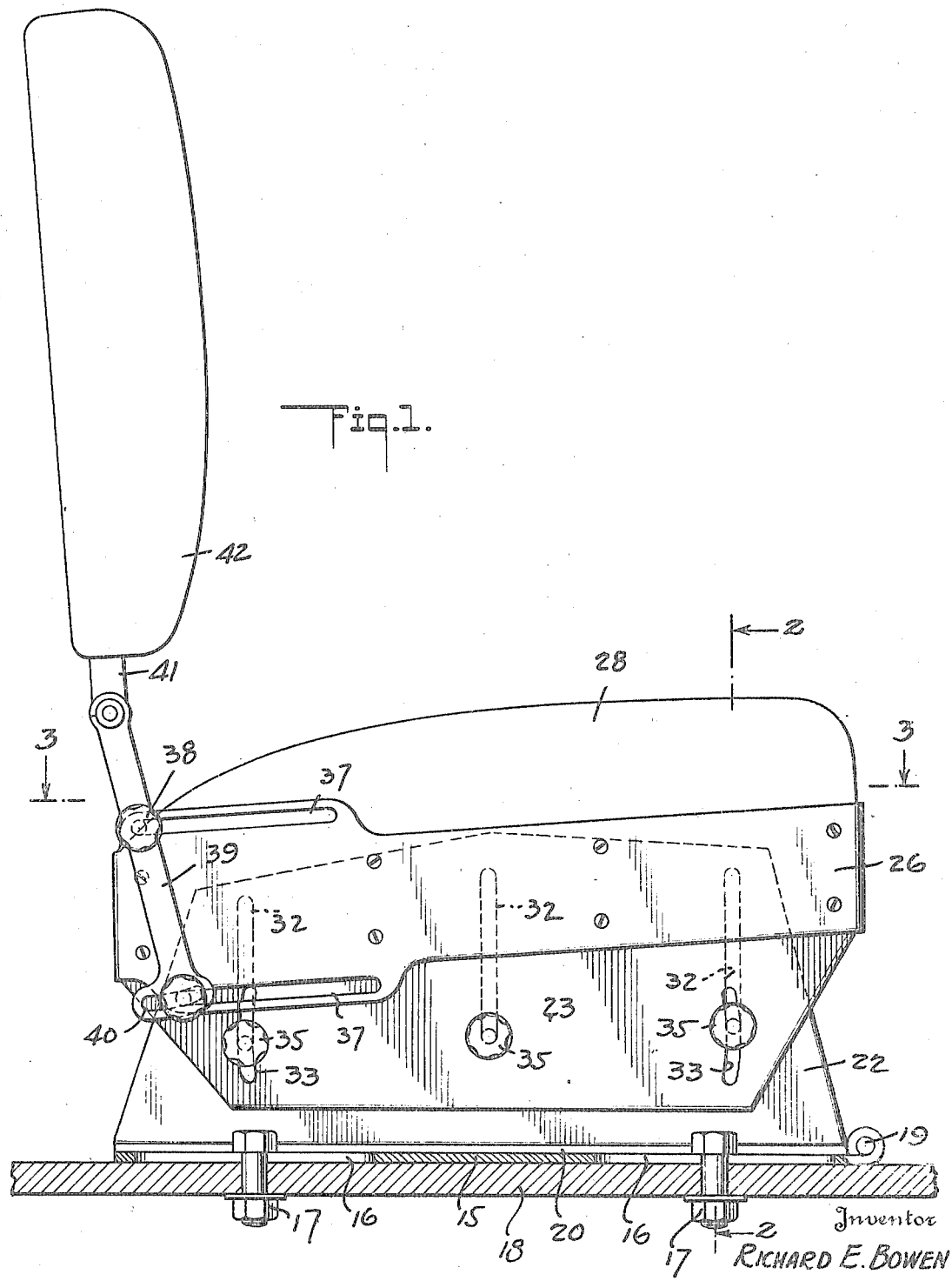
Figure 1 is a view showing in side elevation and partly in section one form of adjustable vehicle seat embodying my invention in applied position to the floor of a motor vehicle.

Referring specifically to the drawings, in which similar reference characters refer to similar parts in each of the views, my invention, in its present embodiment, comprises a base frame made up of a pair of identical bars or plates 15 having slots 16 extending longitudinally thereof for the reception of bolts 17, which latter are secured to the floor 18 of a motor vehicle and capable of manipulation to permit longitudinal adjustment of the bars and the securing of the bars in any longitudinally adjusted position within the limits defined by the slots 16. As shown in Figure 1, the forward ends of the bars 15 are constructed to provide hinges 19 for hingedly mounting the forward ends of a pair of metal strips 20, the latter being riveted or otherwise secured to the base flanges 21 of a pair of plates 22, all as clearly shown in Figure 2. These plates 22 constitute the lower portion of a supporting frame, the upper portion of the supporting frame being made up of a pair of plates 23 having top flanges 24 which are permanently secured to strips 25 formed of wood or other suitable material and constituting part of a seat frame.

Figure 2:
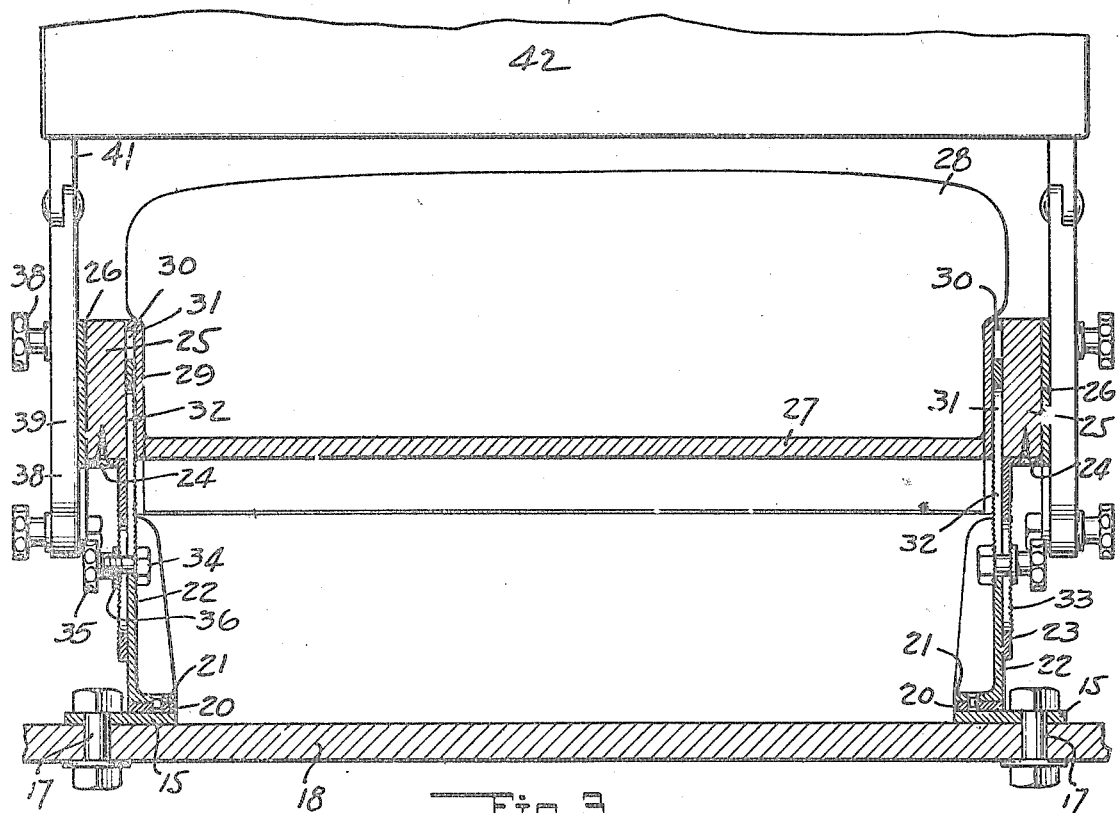
Figure 2 is a vertical sectional view taken on the line 2—2 of Figure 1.
Figure 3:
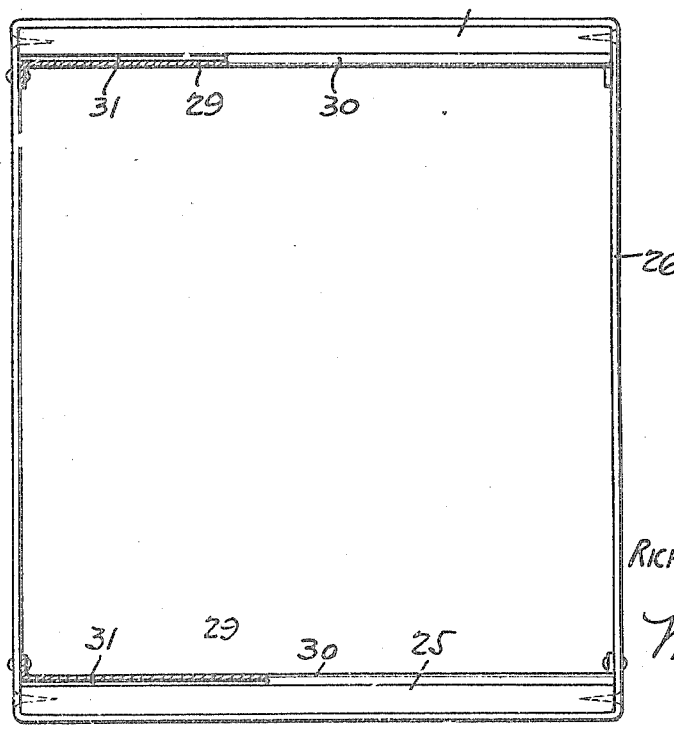
Figure 3 is a horizontal sectional view taken on the line 3—3 of Figure 1.

As shown in Figures 2 and 3, the seat frame comprises a rectangular strip of metal or other suitable material 26 in which is secured a bottom 27 for supporting a seat cushion 28. The strips 25 are secured contiguous to the side portions of the frame 26, and between such portions metallic bars 29 are secured within the frames, as clearly shown. As shown in Figure 2, the upper edges of the bars 29 are lipped as indicated at 30, in order to provide between the bars and strips slots 31 wherein the upper portions of the plates 22 are received.

As shown in Figures 1 and 2, the plates 22 are provided at intervals along the length thereof with vertical slots 32, while the plates 23 are each formed with a pair of arcuate slots 33 at points corresponding to the two end-most slots of the plates 22. The several slots of both plates are adapted to receive bolts 34 provided with headed nuts 35 and washers 36, the bolts and nuts being associated with the plates in the manner clearly shown in Figure 2, and the confronting sides of the washers and bolt heads serrated for engagement with the serrated outer sides of the plates 22 and 23 whereby the bolts and washers can be operated to effectively secure the plates of the supporting frame in adjusted position. The vertical slots 32 permit vertical adjustment of the upper plates 23 on the lower plates 22, and in this manner the seat frame is capable of being adjusted vertically to vary its horizontal position. The arcuate slots 33 permit tilting adjustment of the plates 23 on the plates 22 so that the seat frame can be tilted upwardly or downwardly to vary the inclination of the seat cushion 28.

As clearly illustrated in Figure 1, the side portions of the frame 26 adjacent the rear ends thereof are provided with superposed slots 37 to receive bolts 38 carried by arms 39. The lower ends of the arms are formed with arcuate slots 40 in which the corresponding bolts 38 work, while the upper ends of the arms are hingedly connected to a frame 41 for a seat back 42. Through the medium of the slots 37 and the bolts 38, the arms 39 are capable of horizontal adjustment forwardly or rearwardly with respect to the seat frame so as to vary the position of the seat back 42 forwardly or rearwardly with respect to the seat cushion 28. The construction of the bolts 38 is such as to permit secure locking of the arms in any adjusted position and to thereby fixedly secure the seat back in any adjusted position. The arcuate slots 40 permit tilting adjustment of the arms 39 about the upper bolts 38 as a center, and in this manner the inclined position of the seat back 42 can be varied as desired.

By virtue of the hinged mounting of the strips 20 on the bars of the base frame, the lower plates 22 of the supporting frame are capable of being swung upwardly, thereby permitting a forward folding of the seat, as is desirable in motor vehicles of the coach and coupé types. The association of the base frame with respect to the floor of the vehicle permits the forward or rearward adjustment of the entire seat with respect to the steering wheel of the vehicle in order to accommodate drivers of different leg lengths. The vertical and tilting adjustment of the seat, together with the two adjustments of the seat back, permits such a wide and varied adjustment as to suit the requirements of any driver.

Although I have herein shown and described only one form of adjustable vehicle seat embodying my invention, it is to be understood that various changes and modifications may be made therein without departing from the spirit of the invention and the spirit and scope of the appended claims.

I claim as my invention:

1. A vehicle seat comprising a seat frame, strips within and at the sides of the frame, bars secured within the frame and in spaced relation to said strips to provide slots between the two, a seat supported in the frame between the bars, a supporting frame for the seat frame comprising plates secured to said strips and other plates associated with the first members, and extending into said slots, means for adjustably connecting the first and second said plates to permit vertical adjustment of the seat frame, and a seat back supported on the sides of the seat frame.

2. A vehicle seat as embodied in claim 1 wherein the second said plates of the supporting frame are hingedly mounted on base plates to permit tilting movement of the seat as a whole.

3. A vehicle seat as embodied in claim 1 wherein the second said plates of the supporting frame are hingedly mounted on base plates to permit forward tilting movement of the seat as a whole, said base plates being slotted to receive bolts in a manner to permit longitudinal adjustment of the base plates on a support.

4. A vehicle seat comprising a seat frame, a supporting frame having upper plates secured to the seat frame and lower plates, means for adjustably securing the upper plates to the lower plates to permit vertical adjustment of the plates with respect to each other comprising slots in certain of the plates and fastening members carried by the plates and working in said slots, means for supporting the lower plates, and a pivotal connection between the last means and lower plates to permit upward swinging movement of the lower plates, the other of the plates being formed with arcuate slots to accommodate certain of the fastening members in a manner to permit tilting adjustment of the upper plates with respect to the lower plates.

5. A vehicle seat comprising a seat frame, a supporting frame having upper plates secured to the seat frame and lower plates, means for adjustably securing the upper plates to the lower plates to permit vertical adjustment of the plates with respect to each other comprising slots in certain of the plates and fastening members carried by the plates and working in said slots, and means for supporting the lower plates, the other of the plates being formed with arcuate slots to accommodate certain of the fastening members in a manner to permit tilting adjustment of the upper plates with respect to the lower plates.

RICHARD E. BOWEN.